Patented May 12, 1931

1,804,532

UNITED STATES PATENT OFFICE

ALFRED HOLL, OF OFFENBACH-ON-THE-MAIN, GERMANY, ASSIGNOR TO GENERAL ANILINE WORKS, INC., OF NEW YORK, N. Y., A CORPORATION OF DELAWARE

PROCESS FOR MANUFACTURING VAT DYESTUFFS OF THE ANTHRAQUINONE SERIES

No Drawing. Application filed August 16, 1928. Serial No. 300,146, and in Germany September 10, 1927.

In the German Patent No. 456.763 a process of making vat dyestuffs is described which consists in heating alkylpyrazolanthrones with an alkali hydroxide. These dyestuffs correspond probably to the general formula

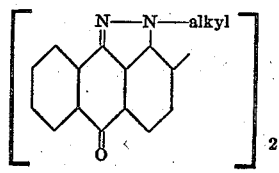

I have found a new and technically simpler process for the production of the same dyesuffs which consists in reducing substituted alkylpyrazolanthrones of the general formula

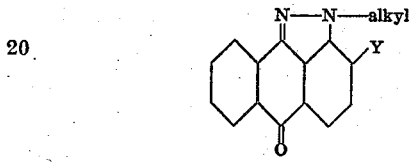

wherein Y means a substituent of the group comprising halogen, a sulfonic acid and mercapto group, which products are obtained by introducing one substituent of the aforesaid kind into the molecule of alkylpyrazolanthrones. By the present reduction process the substituent signified by Y is split off and generally leucocompounds of the vat dyestuffs are obtained which may be converted into the dyestuffs themselves in the usual manner. According to this fact it is not necessary to isolate the dimolecular dyestuffs as such, it being a particular advantage of my process that the monomolecular alkyl pyrazolanthrones substituted by a group of the aforesaid kind can be directly vatted and used in this form for dyeing processes.

In order to further illustrate my invention the following examples are given; I wish it however understood that I am not limited to the particular examples given nor to the specific conditions mentioned. The parts are by weight and all temperatures in centigrades.

Example 1

1 part of chloro-methyl-pyrazolanthrone of the probable formula

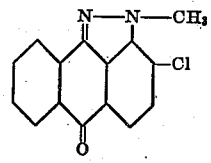

which is produced by acting with a chlorinating agent on methylpyrazolanthrone described in the British Patent No. 264.503 and which represents a light yellow not dyeing substance, is reduced by means of a solution containing 40 parts of lukewarm water, 2 parts of sodium hydroxide and 2 parts of hydrosulfite. In a smooth reaction a blue vat results. By acting with air on the solution the dyestuff may easily be isolated. It corresponds probably to the formula

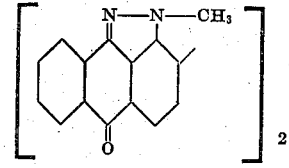

and is identical with that prepared by melting chloro-methylpyrazolanthrone or methylpyrazolanthrone with alkalies or also by the exhaustive methylation of the product obtained by the alkali fusion of pyrazolanthrone.

The above mentioned blue vat obtained by my process may be directly used for dyeing cotton without isolating the dyestuff. In this manner by producing the higher molecular insoluble dyestuff on the fiber fast red dyeings are produced by starting from the yellow monomolecular compound without employing melting alkali.

Example 2

1 part of chloro-methylpyrazolanthrone obtained as described in Example 1 is boiled with 20 parts of alcoholic sodium sulfide solution of 20%. A red precipitate separates which represents the same vat dyestuff as prepared in Example 1. By the action of sodium sulfide another part of starting material is converted into the sodium salt of a methyl-pyrazolanthrone mercaptan corresponding probably to the formula

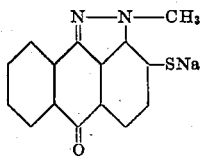

The latter can be isolated from the filtrate of the above mentioned dyestuff by the addition of salt. In the case of this example already the slight reducing action of the sodium sulfide is apparently sufficient for forming the dyestuff condensation but not yet for vatting the dyestuff.

Example 3

The dark red solution of the sodium salt of methylpyrazolanthrone mercaptan, obtained as by-product in the process of Example 2, is warmed with 2 parts of caustic soda solution of 40° Bé. and 1 part of dimethyl sulfate while stirring, until the red tint disappears and a yellow precipitate is formed. Thereby an easily soluble methyl-mercapto methyl pyrozolanthrone corresponding probably to the formula

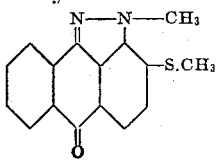

is formed, which splits off the methylmercapto group when treated as described in Example 1 and yields in a smooth reaction the blue vat of the red insoluble dimolecular dyestuff of Example 1.

Example 4

1 part of chloro-methylpyrazolanthrone is warmed with 20 parts of methyl alcohol, 1 part of magnesium powder and 1 part of ammonium chloride. In this manner the same dyestuff is produced as described in the foregoing examples.

Example 5

1 part of chloro-methylpyrazolanthrone is warmed with 1 part of zinc dust and 40 parts of a dilute caustic soda solution of 10% strength while stirring. The blue vat of the above mentioned red dyestuff is formed, which is purified by removing the excess of zinc dust by filtration.

Example 6

Methyl-pyrazolanthrone of the melting point 223° is sulfonated, for instance by the action of 7 parts of fuming sulfuric acid of 20% strength at about 140–150°. The mass of sulfonation is worked up in the usual manner. The orange yellow sodium salt of the formed methyl-pyrazolanthrone sulfonic acid corresponding probably to the formula

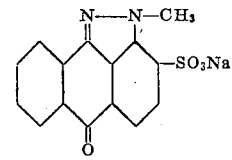

is dissolved in water, the solution is rendered alkaline by the addition of a caustic soda solution, mixed with hydrosulfite and warmed. In the same manner as described in Example 4 a blue vat is obtained while the sulfonic group is split off. Air precipitates therefrom the above described red dyestuff which is insoluble and free from sulfonic groups.

Example 7

Ethylpyrazolanthrone described in the British Patent No. 264.503 is brominated for instance in glacial acetic acid. The obtained bromo-ethylpyrazolanthrone corresponding probably to the formula

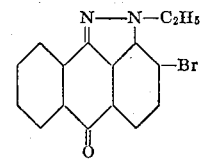

is reduced according to Example 1 and yields thereby in an analogous manner the vat of the dyestuff obtainable by ethylating the product of alkali fusion of pyrazolanthrone and corresponding probably to the formula

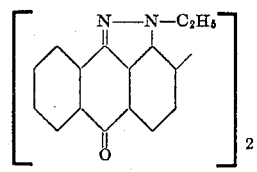

I claim:

1. The process which comprises treating a substituted alkylpyrazolanthorne of the probable general formula:

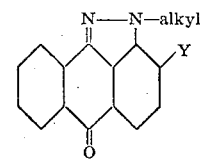

wherein Y means a halogen, a sulfonic, a mercapto or an alkylated mercapto group with a reducing agent and converting the leuco compound thus obtained into the dimolecular dyestuff by means of an oxidizing agent.

2. The process which comprises treating a substituted alkylpyrazolanthorne of the probable general formula:

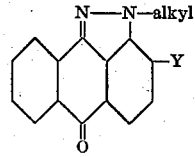

wherein Y means a halogen, a sulfonic, a mercapto or an alkylated mercapto group with a reducing agent, impregnating the fiber with the solution of the leuco compound thus obtained and exposing it to the influence of an oxidizing agent.

3. The process which comprises treating a substituted alkylpyrazolanthorne of the probable general formula:

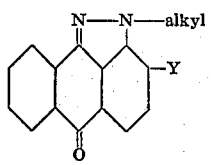

wherein Y means a halogen, a sulfonic, a mercapto or an alkylated mercapto group with an agent used for reducing a vat dyestuff preparatory to dyeing and converting the leuco compound thus obtained into the dimolecular dyestuff by means of an oxidizing agent.

4. The process which comprises treating a substituted alkylpyrazolanthorne of the probable general formula:

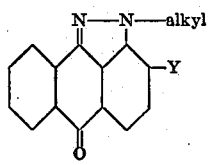

wherein Y means a halogen, a sulfonic, a mercapto or an alkylated mercapto group with an agent used for reducing a vat dyestuff preparatory to dyeing, impregnating the fiber with the solution of the leuco compound thus obtained and exposing it to the influence of an oxidizing agent.

5. The process which comprises treating a halogenated alkyl-pyrazolanthrone of the probable general formula:

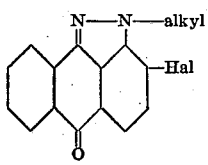

with a reducing agent and converting the leuco compound thus obtained into the dimolecular dyestuff by means of an oxidizing agent.

6. The process which comprises treating a halogenated alkyl-pyrazolanthrone of the probable general formula:

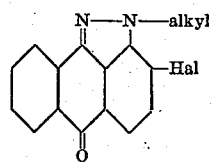

with an agent used for reducing a vat dyestuff preparatory to dyeing and converting the leuco compound thus obtained into the dimolecular dyestuff by means of an oxidizing agent.

7. A process which comprises treating a halogenated alkyl-pyrazolanthrone of the probable general formula:

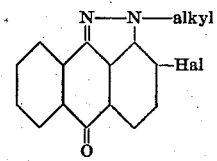

with an agent used for reducing a vat dyestuff preparatory to dyeing, impregnating the fiber with the solution of the leuco compound thus obtained and exposing it to the influence of an oxidizing agent.

8. The process which comprises treating a mono-chloro-alkyl-pyrazolanthrone of the probable general formula:

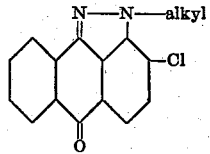

with a reducing agent and converting the leuco compound thus obtained into the dimolecular dyestuff by means of an oxidizing agent.

9. The process which comprises treating a mono-chloro-alkylpyrazolanthrone of the probable general formula:

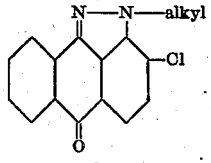

with an agent used for reducing a vat dyestuff preparatory to dyeing and converting the leuco compound thus obtained into the dimolecular dyestuff by means of an oxidizing agent.

10. The process which comprises treating a mono-chloro-alkyl-pyrazolanthrone of the probable general formula:

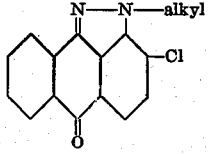

with an agent used for reducing a vat dyestuff preparatory to dyeing, impregnating the fiber with a solution of the leuco compound thus obtained and exposing it to the influence of an oxidizing agent.

11. The process which comprises treating mono-chloro-methyl-pyrazolanthrone of the probable general formula:

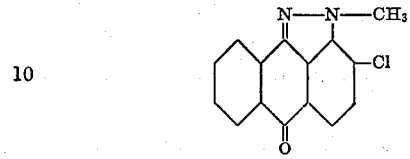

with an agent used for reducing a vat dyestuff preparatory to dyeing, impregnating the fiber with a solution of the leuco compound thus obtained and exposing it to the influence of an oxidizing agent.

In testimony whereof, I affix my signature.

ALFRED HOLL.